(12) United States Patent
Pelz

(10) Patent No.: US 6,391,201 B1
(45) Date of Patent: May 21, 2002

(54) METHOD FOR BIOLOGICAL NUTRIENT CONTROL

(75) Inventor: Richard A. Pelz, Mechanicsville, MD (US)

(73) Assignee: Circle C Oyster Ranchers Association, Inc., MD (US)

( * ) Notice: Subject to any disclaimer, the term of this patent is extended or adjusted under 35 U.S.C. 154(b) by 0 days.

(21) Appl. No.: 09/708,671

(22) Filed: Nov. 9, 2000

(51) Int. Cl.$^7$ .................................................. C02F 3/32
(52) U.S. Cl. ....................... 210/602; 210/747; 210/906; 210/908
(58) Field of Search ................................. 210/602, 630, 210/747, 170, 242.1, 903, 906, 908

(56) References Cited

U.S. PATENT DOCUMENTS

| | | | |
|---|---|---|---|
| 4,086,161 A | * | 4/1978 | Burton |
| 5,337,516 A | * | 8/1994 | Hondulas |
| 5,389,257 A | * | 2/1995 | Todd et al. |
| 5,520,810 A | * | 5/1996 | Goudy, Jr. et al. |
| 5,549,828 A | * | 8/1996 | Ehrlich |
| 5,628,904 A | * | 5/1997 | Bean |

* cited by examiner

*Primary Examiner*—David A. Simmons
*Assistant Examiner*—Fred Prince
(74) *Attorney, Agent, or Firm*—H. Jay Spiegel

(57) ABSTRACT

A method for biological nutrient control to modify nutrient levels in open waters so that these waters can produce food, be used for recreation, and be healthy areas for human activities or for other uses. This system can be designed and operated to increase, decrease or maintain nutrient levels. Large numbers of filter feeding shellfish which produce pseudofeces (with one notable process exception) can be retained in slow to intermediate water flow where phytoplankton production can be counted on to support them. These Molluscan shellfish are held in aquaculture production and used to filter particulate and colloidal materials as well as microscopic plants from the water. The shellfish then process this material. The removal of particulate and colloidal material by the shellfish from the water column can be used to increase light penetration, thereby allowing photosynthesis to occur at an increased depth, providing oxygen to the sediment/water interface. The further processing of sedimented material by nitrifying and denitrifying bacteria to create nitrogen gas can be enhanced or impeded using specific controls within the system. Burial and sequestration of particulate nitrogen and phosphorus compounds can also occur or be prevented. The maintenance of oxygen to the bottom traps the nutrients in the sediment. The shellfish may be harvested, removing the plant nutrients they have incorporated with them. They are then replaced in the system by young animals to continue the cycle.

22 Claims, 12 Drawing Sheets

(8 of 12 Drawing Sheet(s) Filed in Color)

St Jeromes Creek, St Mary's County

METHOD FOR BIOLOGICAL NUTRIENT CONTROL

BACKGROUND OF THE INVENTION

The present invention relates to a method for biological nutrient control. The present invention marries together two disparate industries, namely, the shellfish growing industry and the sewage treatment industry. Normally, these industries are mutually exclusive for reasons explained in greater detail below. However, Applicant has found that the marriage of these two disparate industries together may provide results advantageous to both.

Numerous laws and powerful public opinion separate shellfish producers and waste disposal operators. The present invention would require a marriage of the two disciplines to create any significant financial reward.

Some of the chemical reactions and biological processes in the present invention, which are described below, are important in sewage treatment plants, while the others are important to shellfish growers. Sewage treatment and shellfish growing are at best competing uses of a public resource, open water. When these systems malfunction, there are legal battles and bad press for both sides. The divide between the two groups is re-enforced by health and environmental officials, regulations and law.

Shellfish are normally produced in waters where excess nutrients are not a problem, and nutrient removal is unnecessary. Existing Domestic and Foreign Laws require that shellfish produced for human consumption come from unpolluted water. New entrants into this field avoid polluted waters because they will not be allowed to sell their product. Established growers of shellfish avoid any mention of pollution in conjunction with their product. Excess nutrients, otherwise known as fertilizer, cause major detrimental effects in water environments and are a form of pollution. Pollution, in the public's perception, includes mercury, raw sewage, and oil spills. Shellfish producers' reputations are built by selling a safe and healthful food product to the public. They must avoid pollution and, beyond that, even the mention of it. Their reputation and livelihood depend on it.

In some areas in countries like Japan and France, low nutrient levels are the problem. In areas where nutrient levels are too low, this may preclude the use of nutrients available from pollution sources because they may contain dangerous contamination.

Sewage plant operators are members of a much larger group than shellfish producers. Because most pollution control is done by them in-house or for the general public, the operator is labeled a polluter. Their task is to clean up pollution.

The most obvious polluter is the point source which typically comes out the end of a pipe. These pollution discharges usually come from industrial or sewage treatment plants. The operators of these facilities are required to clean up the water they release, prior to discharging it. Cleaning up the body of water into which they have been discharging is equivalent to an admission of guilt; that they had not done their job. In the current political environment, the thrust of regulation and legislation has been to punish the polluters and to force them to clean up the water. If they accept this punishment, they admit guilt. Admission of guilt is not a wise move.

Because shellfish producers need clean water, they have been in the forefront in pressing for anti-polluter laws. They are pressured by public health scares concerning food born illness caused by eating raw or partially cooked shellfish. This push for clean water has further alienated the two disciplines. Because of the devastating economic impact on sales that immediately follows any reported outbreak of illness, new discharge points are strongly opposed by shellfish growers and harvesters alike. The recent *Pfeisteria piscicida* scare illustrates this point. Maryland Seafood industry sales fell by a reported $63 million as compared to the previous year.

Environmental groups have recently targeted the non-point source polluter, following events such as the Pfeisteria outbreak. Regulations have been quickly written to control this newly recognized threat to public health. To the general public, a non-point source polluter usually means the "farmer". These new targets of regulation are also being told not to let pollutants get into the water. This group is still putting together methods to comply with the new rules. The political division between non-point source polluters and shellfish producers is growing stronger due to the way the Maryland's Pfeisteria outbreak was handled by politicians and the press.

Phosphorus fertilizer from chicken production farms was blamed for the outbreak.

Treating large bodies of water for excess phosphorus has been traditionally seen as prohibitively expensive, and some methods come with negative environmental side effects. One well-documented case, The Twin Lakes Study, was demonstrated in Ohio. Professors from Kent State treated one of two nearly identical lakes with alum. As planned, this chemical effectively sealed phosphorus into the bottom sediments. However, it had deleterious effects on crustacean populations, reducing species diversity by more than half. This makes hypolimnetic infusion of alum a non-viable choice for many areas. One example of where this would be especially true is the Chesapeake Bay, where the Blue Crab is the foundation of an important commercial fishery.

Nutrients are carried by water throughout the hydrological cycle. Man's activities and natural processes enrich this water with nutrients at every step along the way. Moisture gathers in clouds where it absorbs nitrates formed by lightning and pollution (over half of the nitrates formed in the world are produced by lightning). Internal combustion engines produce $NO_2$ gas that combines with the water in clouds. Dry materials that have been lifted into the air are picked up by the water droplets in clouds or by precipitation falling to the ground.

Precipitation, usually in the form of rain, can fall directly on open water or on land. Rain and melting snow dissolve more nitrates and phosphates from the land and carry them to open water. This nutrient loaded water can get to open water rapidly in the form of run-off. Precipitation can also seep through the soil to reach the water table, which flows downhill until it reaches open water. The water that sinks into the soil leaches more nutrients from the soil carrying them into the water table. The water table then feeds running streams and springs or seeps directly into the receiving waters. Water that does not evaporate eventually makes its way to our ponds, streams, and lakes and then on to the ocean by way of our estuaries.

Wind is another source of nutrients. It picks up dry material such as leaves, pollen dust, and soil, depositing them on the water surface.

Man pumps water out of the ground and then returns it to the ground, usually as nutrient rich treated sewage. This nutrient rich water is pumped directly down to the water table by sewage treatment plants or leaches from septic fields. These nutrients are then carried by the ground water into lakes and streams. In the case of an estuary, not only are nutrients introduced via rain and run-off, they are also brought in on every incoming tide. One way of looking at the unique position of an estuary is that it is always downhill from the land and that half the time it is downstream from the ocean (when the tide is incoming). Ninety six percent of the water leaving the Chesapeake Bay came into the Bay from the Atlantic Ocean.

Estuaries receive nutrient input from every direction, land, sea, and air. These nutrients arrive in open water in two forms, that which is immediately available to plants and that which is not. Phytoplankton almost immediately take up the available nutrients. This produces a chemical imbalance that drives chemical reactions, which turn some of the unavailable nutrients into available forms. Organic material, which enters the open water, is rapidly processed by bacteria and zooplankton releasing more nutrients. As these nutrients become available, they are rapidly taken up by phytoplankton, spurring growth.

Under normal mesotrophic and oligotrophic conditions, there is a limited supply of nutrients. Phytoplankton species that can most rapidly capture these nutrients have a major competitive advantage. In single celled plants, there is little storage capacity for these nutrients so they are metabolized rapidly. This is why an excess of nutrients usually results in rapid population growth. Phytoplankton populations can typically double every 3 days under mesotrophic conditions. This can be reduced to as little as a few hours in eutrophic conditions where these plants have an unlimited supply of nutrients.

Eutrophic conditions occur when so many nutrients are available that they no longer limit the population growth of phytoplankton. This is how blooms occur. Liebig wrote his LAW OF MINIMUM which states: "Yield of any organism will be determined by the abundance of the substance that in relation to the needs of the organism is least abundant in the environment." So when nutrients become abundant, they are no longer a limiting factor. This allows the phytoplankton population to grow until it reaches a new limit. When a bloom occurs, phytoplankton populations increase exponentially, doubling every couple of hours. Large phytoplankton populations found in bloom conditions absorb all of the sunlight available for photosynthesis a short distance below the surface. Sunlight becomes a limiting factor. Plants below the bloom, with no means of producing food, start to die.

Dead and dying masses of phytoplankton increase the food available for bacteria and a bacterial bloom begins to take place below the surface.

This rich broth of phytoplankton and bacteria removes the food constraint on zooplankton and a third bloom starts to take place. The bacteria and zooplankton rapidly deplete the oxygen in the water around them under the phytoplankton bloom forcing the zooplankton, which need oxygen and can swim, to concentrate on consuming the plants above them. Facultative bacteria do not need oxygen but will use it if it is available. These bacteria switch to anaerobic (no oxygen) respiration and continue to consume the steady rain of food from the surface. As the zooplankton population grows, it outstrips the phytoplankton population growth. At this point, the zooplankton population runs out of food. Because of their size and rapid metabolism, they quickly starve to death and fall down into the bacteria laden water below where they are consumed as well. As the bacteria feed on the microscopic dead plants and animals, they remove all of the available oxygen from the water. Fish swimming into these areas can rapidly die, providing more food for the bacteria. The bacteria working on all of this organic material release massive amounts of nutrients and the process starts all over again.

Eutrophic water presents a number of problems for mankind. It can be dangerous to human health as in the case of Pfeisteria, certain species of blue-green algae, and other toxic micro flora and fauna. Eutrophic water produces little in the way of food, and its recreational value is greatly reduced. Because of this, scientists have come up with numerous ways to correct the problem. Most of them deal with preventing nutrients from entering the water. In water bodies that flush regularly, this can eventually have the effect of reducing or eliminating eutrophication. The water moving through these areas eventually will carry away the excess nutrients in the water column to other areas downstream giving someone else the problem.

Estuaries are downstream from everything on land. They also are downstream from the ocean at low tide. This situation causes a fresh supply of nutrients to be continuously supplied to an estuary. Because of this, eutrophic conditions in estuaries are extremely problematic.

Mesotrophic water bodies are highly efficient in dealing with incoming nutrients. Phosphorus is removed by direct burial in the sediments where it is locked in by an oxygenated micro-zone at the water sediment interface. Phosphorus levels in the sediments can build up to 10 or 20 times the level in the overlying water with no ill effects, as long as this oxygenated micro-zone remains in place. Nitrogen in its particulate forms is also removed from the system by direct burial. Another important process also occurs here. It is the conversion of nitrogen compounds back into harmless atmospheric nitrogen ($N_2$) through a process called denitrification. This happens in the anoxic sediments below the oxygenated micro-zone, however, it can only occur when there is enough carbon available. This carbon is most efficiently made available by aerobic bacterial action on organic material in the oxygenated micro-zone.

The Biological Nutrient Control system of the present invention acts to remove nutrients and carbon bearing organic material from the water-column and deposits them on the bottom. Because particulates in the form of phytoplankton and suspended solids are removed, light extends deeper into the water. With this light, plants can carry on photosynthesis and produce oxygen further below the surface. This oxygen is then used by bacteria, in the micro-zone at the sediment water interface, in the process of nitrification. Some of the nitrates diffuse downward and various species of anaerobic bacteria remove the oxygen from the nitrate releasing $N_2$ gas in the process of denitrification. The oxygen maintains the electrical potential difference necessary to keep nutrients sequestered in the sediment. As more material is deposited onto the bottom, these nutrients are buried and can remain there indefinitely unless disturbed.

In this way, phosphorus is sequestered in the sediments where it remains and nitrogen compounds are either turned back into $N_2$ gas and released into the atmosphere or they are buried as particulate matter in the sediment.

These burial and gasification processes are how a properly working mesotrophic body of water works. In unbalanced eutrophic waters, anoxic events occur on a regular basis. Carbon production is inhibited and phosphorus removal pathways reverse during an anoxic event. Due to the loss of oxygen, electric potentials actually reverse, pumping nutrients, especially phosphorus, out of the sediments.

Because of this, restricting phosphorus intakes may have little or no effect for a very long time in areas where massive amounts of phosphorus are available in the sediments or bottom-flushing rates are low. This can occur in reservoirs behind overshot dams where surface waters are released downstream and in estuaries where the heavier saltwater near the bottom tends to move upstream. In estuaries, which empty onto the continental shelf, phosphorus from the shelf is actually carried into the estuary with the salt water.

The present invention teaches how oysters and other shellfish can be used to remove excess phosphorus from eutrophic waters. An oyster farm is known as a water purifying means. An example of such a farm is described in Sea Frontiers, Volume 19, No. 6, November–December, 1973, pages 368–373. This article fails to teach the use of oysters in a natural body of water. Although the article teaches the use of oysters as a water purifying means, it fails to deal with waste disposal or the role of bacteria, oxygen and other matters in the control of nutrients.

In order to return the co-system to working order, the biological balance needs to be restored.

SUMMARY OF THE INVENTION

The present invention relates to a method for biological nutrient control. The present invention is designed to return eutrophic waters to mesotrophic conditions that can again produce food, be used for recreation, and be healthy areas for human activities.

The present invention can also be used to produce oligotrophic conditions as a means of purifying water for man's use. In addition, the present invention can be used to increase nutrient levels where enhanced productivity would be beneficial. An example of this last use would be to enhance nutrients in an over-grazed area off the Japanese coast. The present invention provides a control for nutrient management very much like a thermostat does with air temperature. It provides a means to change nutrient levels in the water column and once the desired levels are reached, the present invention can be used to maintain the desired levels.

The present invention can be used in eutrophic, mesotrophic, and oligotrophic conditions, in fresh, estuarine and salt water, and from the tropics to the sub arctic. The present invention can be practiced anywhere that large numbers of filter feeding shellfish, which produce pseudofeces, can be retained and where phytoplankton production can be counted on to support them. If these first two criteria are met, the third component, bacterial growth, is fairly certain. For greatest success, the present invention should be located in slow to intermediate water flow. However, this flow can be provided by mechanical means whenever necessary, such as pumps, blowers, paddle wheels, etc., and fast currents can be slowed with weirs, dams or other means.

The present invention consists of a process starting with nutrients entering a water body from a variety of sources. Such sources include point sources or non-point sources which include land runoff, ground water, precipitation, release from bottom sediments, and deposition of materials by wind.

Within the water body, these nutrients take on two forms, dissolved and particulate. Microscopic plants take up dissolved nutrients. In addition, dissolved nutrients are adsorbed to organic colloids, inorganic colloids and particulate compounds (e.g.) clays, carbonates, hydroxides. (Wetzel, 1983)

Molluscan shellfish that produce pseudofeces are held in aquaculture production and used to filter particulate and colloidal materials as well as microscopic plants from the water. The shellfish then process this material in two (2) ways.

1) Particles that are too large or too heavy for the shellfish to consume are sorted, and then incorporated into pseudofeces that are then ejected back into the water. The pseudofeces then fall to the bottom.

2) Particles suitable for food are ingested. Some of the plant nutrients are incorporated into the shellfish, some are incorporated into solid waste and the balance is recycled. It is recognized that numerous recycling processes take place within the water body. They are not discussed here because they are not part of the nutrient control process of the present invention for either increasing or removing nutrients.

The removal of particulate and colloidal material by the shellfish from the water column increases light penetration. Light penetration is a system control point. The amount and depth of light penetration either enhances or reduces oxygen production. By allowing photosynthesis to occur at an increased depth, oxygen is provided to the sediment/water interface. This is important in nutrient reduction systems. By reducing light penetration, photosynthesis is reduced or eliminated, thus denying oxygen to the water-sediment interface. This is important in nutrient enhancement systems.

An Oxidized micro-zone at the water-sediment interface was demonstrated to prevent significant releases of Phosphorus from the sediments by Mortimer in 1971. The reverse, of course, is also true. As more material is deposited, the phosphorus contained in the shellfish feces and pseudofeces is sequestered in the sediments and removed from the water by direct burial in the sea bed. Lack of oxygen keeps phosphorus in soluble form; available in the water for plant growth.

Aerobic bacteria in the oxidized micro-zone degrade the feces and pseudofeces in a process known as nitrification according to the formula:

$$NH_4^+ + 2O^{2-} \rightarrow NO_3^- + H_2O2H^+ \tag{1}$$

(Wetzel 1983)

Conditions must be aerobic for nitrification to occur.

Lack of oxygen precludes the existence of aerobic bacteria and prevents this process from occurring.

Anaerobic bacteria further process nitrogen compounds contained in the shellfish feces and pseudofeces in the sediment. The general sequence of the process is according to the formula:

$$NO_3^- \rightarrow NO_2^- \rightarrow N_2O \rightarrow N_2 \tag{2}$$

(Wetzel 1983)

This sequence takes nitrogen fertilizer and changes it into harmless $N_2$ gas, while stopping the process at the previous step prevents the loss of nitrate as $N_2$ gas. Nitrogen gas then returns to the atmosphere or diffuses into the water. The shellfish feces and pseudofeces provide the carbon necessary for the reaction to take place.

The shellfish are harvested, removing the plant nutrients they have incorporated with them. Mature shellfish are then replaced in the system by young animals to continue the cycle. Removal of mature shellfish is important because, if they are allowed to die in the system, 90% of these nutrients will be released into the water.

The processes of nitrification, denitrification nutrient sequestration, and burial described above have been documented in fresh, estuarine, and salt water. Reference is made to Boynton, W. R., J. H. Garber, R. Summers, W. M. Kemp: *Inputs, Transformations, and Transport of Nitrogen and Phosphorus in Chesapeake Bay and Selected Tributaries.* Estuaries Vol. 18 No. 1b, p. 285–314 Estuarine Research Federation March 1995; *Chemical Exchanges Between Sediments and Water in the Great Lakes—Speculations on Probable Regulatory Mechanisms,* Limnol. Oceanography, 16:387–404; and Wetzel, Robert G. Limnology, CBS College Publishing. Saunders College Publishing. ISBN 0-030057913-9 767PP.

The system used to conduct the process described above will be described in greater detail below.

Accordingly, it is a first object of the present invention to provide a method for biological nutrient control.

It is a further object of the present invention to provide such an invention wherein shellfish are employed to clean and clarify a body of water.

It is a still further object of the present invention to provide a process practiced in moderate to slow moving water.

It is a still further object of the present invention to provide such a process in which phosphorous transfer, to or from the bottom sediment is controlled as the process is practiced.

It is a yet further object of the present invention to provide such an invention in which means are provided to contain shellfish within a prescribed area with the shellfish suspended above the bottom.

These and other objects, aspects and features of the present invention will be better understood from the following detailed description of the preferred embodiments when read in conjunction with the appended drawing figures.

BRIEF DESCRIPTION OF THE DRAWINGS

The file of this patent contains at least one drawing executed in color. Copies of this patent with color drawings will be provided by the Patent and Trademark Office upon request and payment of the necessary fee.

SPECIFIC DESCRIPTION OF THE PREFERRED EMBODIMENTS

Figure 1:
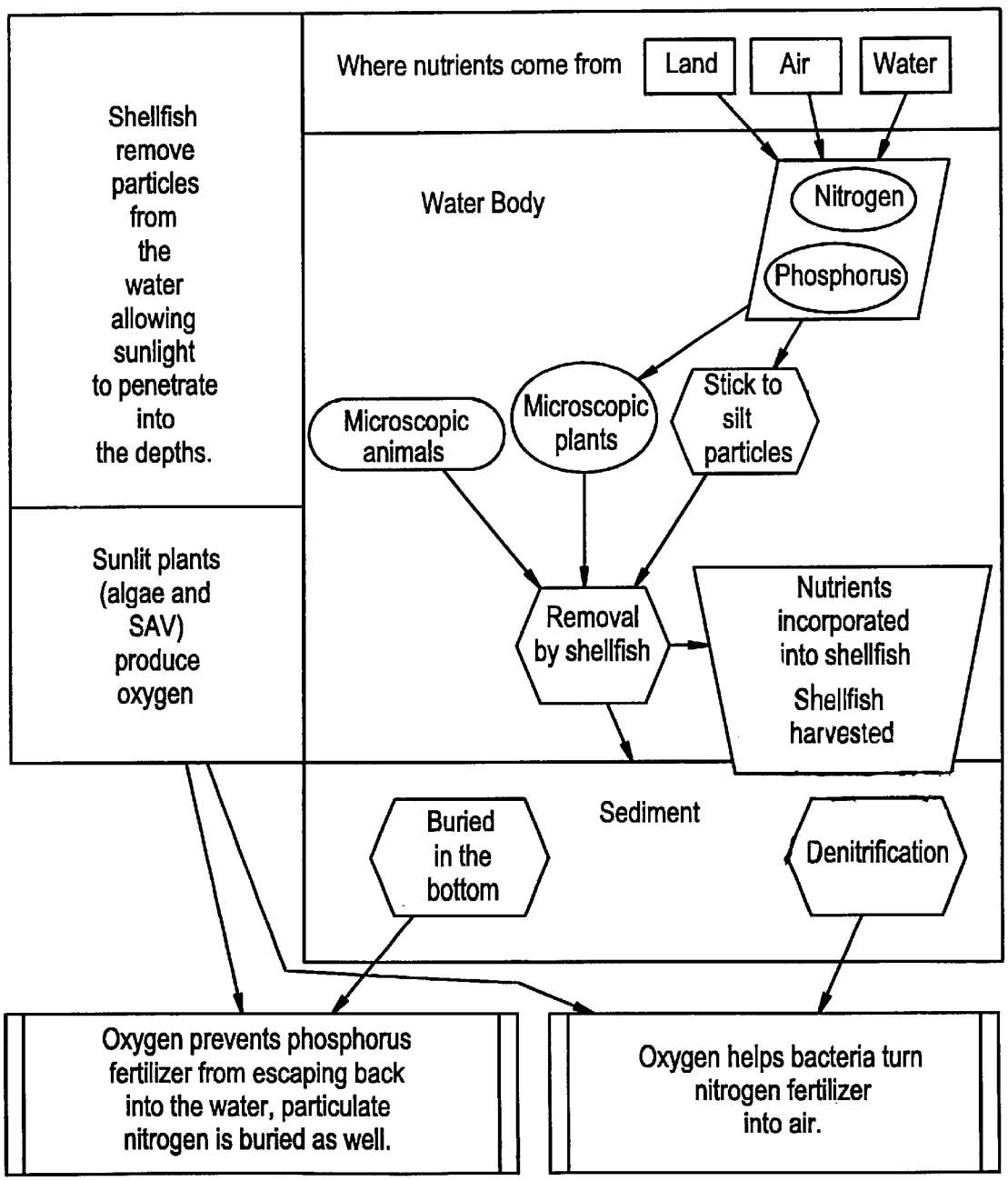
FIG. 1 shows a schematic diagram of the process of the present invention by which the nutrient levels in a body of water are controlled.

In practicing the teachings of the present invention, the following steps are preferably undertaken:

(1.) Select the body of water to be treated among the following choices: Lake, Pond, Stream, River, Estuary, Ocean Bay or other body of water. Choose a definable finite area such as a pond, reservoir or estuary. This sets the scope of the project. Natural and man-made open water bodies are usually connected and flow into one another. For example, although it may be desirable to control nutrient levels through the entire Mississippi River, it would be easier to do this one region at a time. Selecting a manageable size is important to the success of the inventive process. The project can be too large for one system and may require multiple systems of various types. This would occur in an estuary where salinity varies from one end to the other and different species of mollusk would be required. A body of water can also be too small for the system to successfully operate. For example, one mature oyster of the species *C. virginica* is capable of filtering 50 gallons of water per day. Phytoplankton production is necessary for the system to work. The system needs to be sized according to the end goal. If mesotrophic conditions are desired, a minimum of 3–4 times that volume of photic (light penetration) zone water is required to maintain a standing population of phytoplankton to feed the mollusks. As such, at least 200 gallons of photic zone water will be required for one mature oyster or 300 gallons for one mature hard clam. For example, these mollusks will not work in a system designed for a 5-gallon aquarium.

(2.) Evaluate the water body to see if it is suitable for the inventive process.

Suitability Criteria

Water flow: Requirement will vary according to the species chosen. Engineered structures and equipment can be used to bring these within the proper parameters. Usually speeds between .2->4.0 knots are acceptable.

Water system fertility: Eutrophic, mesotrophic, oligotrophic.

Level of nutrient loading:

Nitrogen levels

Phosphorus levels

Other nutrient levels may be important.

Ability to support life of:

Phytoplankton

Nitrifying bacteria

Denitrifying bacteria

Mollusks

Climate: Ice and snow cover may reduce the depth of the photic zone.

Examples of unacceptable Pollutants:* (If mollusks are to be used for food)

Thermal

Chemical contamination: mercury, pcbs Insecticides, radioactive isotopes

Biological: raw sewage from humans, livestock, or wildlife.

(3) Select the location for the inventive system. The position of the system within the body of water to be treated is the most important choice that needs to be made. Water flow carries the phytoplankton from its growing area to the intercept array. The shellfish held in the array will consume some of the algae and remove other particulate matter from the. water. The water will continue to flow on through the intercept array carrying with it the pseudofeces and feces produced by the shellfish. The waste stream coming from the shellfish settles out of the current in the deposition area. This deposition area is called the "plume".

(a) First, locate the area of maximum Phytoplankton production. Areas of maximum phytoplankton production may be found adjacent to areas of upwelling. Mortimer, C.

H. (1971): Oscillatory Motions and Seasonal Temperature Changes in Lake Michigan and Lake Ontario. Special Report No. 12, Center for great Lakes Studies, University of Wisconsin-Milwaukee, Part I Text, 111 pp. and Part II Illustrations, 106 pp, is very useful in understanding and locating these areas. These areas include stretches along the lee shore, downstream from the plunge point in a reservoir or estuary, and they can be engineered into the system. To create a plunge point in a stream or river, one only needs to build a dam.

Next, one needs to survey the size of the phytoplankton production area. This area will be determined by water residency time ($T_W$). $T_W$ will be 3 to 4 days to allow the algae population to double in mesotrophic conditions. A $T_W$ of less than 3 days can result in overgrazing if the array has an efficiency of 50% or greater and the water goes through the array multiple times as in tidal areas.

Stratification is an important consideration when locating the area of maximum Phytoplankton production. Stratification occurs in most bodies of water due to differences in water density caused by temperature and/or salinity variances. Under eutrophic conditions, once stratification takes place, oxygen is quickly depleted from the water in the hypolimnion (the densest layer of water on the bottom) by biological processes. Bacteria populations consume excessive quantities of organic material. This is the primary reason for the loss of oxygen. At this point, anaerobic respiration dominates the water/sediment interface and large quantities of phosphorus can be released from the sediments into the water column. When mixing occurs between the stratified layers for any reason, this phosphorus fertilizer immediately becomes available for plant growth in the upper layer. The obvious examples of how this mixing can occur are wind, wave, and tide. A steady wind blowing across a body of water in one direction pushes the surface water along with it. Water from below rises near the leeward shore to replace the warmer water that has been blown away. This upwelling brings with it large amounts of nutrients which become available for plant growth and cause extensive phytoplankton blooms in eutrophic waters.

Mixing of the upper and lower layers of stratified water also occurs in reservoirs where incoming water from a stream is colder than that of the impoundment. The location of this occurrence is called the plunge point. At the plunge point, incoming surface waters dive below the surface water of the reservoir displacing water near the bottom and forcing it upward. Knowing the location of the plunge point and zones of upwelling is important in determining the location of the zone of maximum phytoplankton production. A thermometer is used to locate the plunge point because it is marked by a distinct rise in surface water temperature on the downstream side. Downstream from this point is a zone of mixing where primary production increases. The plunge point migrates up and down the reservoir with changes in incoming flow. Applicant has found that the best placement for the array is usually near the downstream end of the mixing zone.

If the body of water to be treated is an estuary, areas are chosen where tidal flow is moderate. Strong flows will sweep the deposited material out of the area and it will not drop to the bottom in an area where it will be processed. Low flows may not provide the shellfish enough food to support growth and will decrease removal rates. The best locations have been found to be approximately one-third of the way upstream from the mouth.

Mixing of stratified layers can also occur when surface waters become denser than the underlying water. This can happen in the fall and spring, especially in fresh water lakes. This turnover usually occurs in conjunction with a cold rain that cools surface water. This phenomenon will affect an entire lake or pond. Care must be taken to avoid these events when attempting to locate upwelling areas or the plunge point. In the British Isles, for example, this event can happen in fresh water ponds throughout the winter, so identification of plunge points and areas of upwelling must be done in the other seasons.

(b) The plume area is next located. This is the area of deposition and bacterial processing. In an estuary, the plume of droppings can be expected to be two-thirds upstream and one-third downstream. The selection of this area will vary according to the current condition and the desired condition. For example, if the current condition is eutrophic and the desired condition is mesotrophic, there will be two sections to the plume area because there is a temporary plume area located in shallow water. This is necessary to have an oxygenated micro-zone while eutrophic conditions still exist. The target depth of the photic zone will extend into the hypolimnion. The permanent plume area should be deeper than the targeted depth of the photic zone to prevent Submerged Aquatic Vegetation (SAV) establishment. If SAV roots in the plume area, it will lower the effectiveness of the inventive system for this use because SAV actively pumps phosphorus back into the water column. The plume size and shape can be calculated from the water speed, settling rate of the waste produced by the shellfish, and the distance it needs to fall to reach the bottom in the plume area in a manner known to those skilled in the art. The plume should be located in an area likely to remain undisturbed in the hypolimnion. This is important so that buried nutrients will not be resuspended.

To drive mesotrophic conditions to oligotrophic and maintain them, overgrazing is required. Several controls can be used to accomplish this. 1) Place the intercept array to reduce $T_W$ (residency time for algal production) below 3 days. 2) Increase bivalve biomass. It is important that this be done carefully. The bivalves should have enough food to survive but growth rates should be significantly reduced. Target depth of the photic zone should extend to the bottom. SAV can be expected to become established in areas advantageous to it. In this case, the plume area should contain SAV that will utilize the nutrients made available by the array.

If the current condition is oligotrophic and the desired condition is mesotrophic, the target depth of the photic zone is into the hypolimnion and does not extend to the bottom. There will be two sections to the plume area, one made by the array used to make the change, and the other made to stabilize conditions as mesotrophic (preventing the system from going eutrophic). The initial array, the one used to make the change, is the only case where it is advisable to switch species of bivalves to non-pseudofeces producing animals such as Pecten (scallops). Place the array so that it shades SAV beds to increase nutrient loading. Decaying plant material in the shaded beds will release nutrients into the water. Choose the plume area so that the feces and pseudofeces fall on hard material instead of soil. This will reduce the amount of nitrogen fertilizer converted to $N_2$ gas and reduce phosphorus burial and sequestration. The bottom can be hardened, if necessary, by the placement of shell or other material. The plume area for the permanent mesotrophic stabilizing array is described above in the section on treating eutrophic conditions.

Driving conditions from mesotrophic to eutrophic may be useful in some situations such as production of specific species of algae. In this case, the target depth of the photic zone does not extend into the hypolimnion. First, use the methods described above to move a system from oligotrophic to mesotrophic, leaving out the use of scallops or other non-pseudofeces producing bivalves. This will increase organic loading to the hypolimnion, maximizing bacterial growth ad oxygen consumption. Increase residency time $T_W$ to exceed 3 days. Lower the array in the water to the bottom of the desired photic zone so that pseudofeces and feces will fall into water where photosynthesis is not producing oxygen.

The plume area should be located, whenever possible, over phosphorus bearing soils so that anoxic conditions at the sediment interface will cause the migration of phosphorus into the water column.

(c) The intercept array is located directly in the flow from the algal field to the plume area. Moving water is required to bring food and other filterable materials to the bivalves. The array is placed so that the waste stream will fall directly onto the bottom within the designated plume area. Water flow throughout the array site must be sufficient to move significant amounts of phytoplankton past the shellfish. If the water velocity is too high, the shellfish will not have sufficient time to efficiently remove the algae. If it is too slow, the first part of the array will produce growth in the shellfish and the rest may starve. Water control structures may be provided to correct these deficiencies. However, this will add cost to the inventive system that may be avoided through proper site selection. The array is sized according to the amount of material needed to be removed, the filtration rate of the shellfish, and the capacity of the aquaculture equipment within the array.

The best array site to change eutrophic conditions to mesotrophic conditions lies in an appropriate array configuration in relatively shallow water within the Photic zone. The water needs to be shallow enough to allow pseudo-feces and feces to hit the bottom intact in an area with an oxygenated bottom. The present invention is designed to keep phytoplankton numbers in check and shallow water is easier to clear. Shallow water also heats more readily allowing faster processing of materials on the bottom and is less likely to stratify. Vertical mixing occurs more readily in shallow water, breaking stratification when it occurs, maintaining good oxygen levels throughout the water column. Keeping a constant supply of oxygen to the micro-zone is imperative.

The filtration rate of the shellfish must be such that the photic zone extends through the epilimnion into the hypolimnion. If the array is being designed to move from mesotrophic to oligotrophic and hold it there, the array should be designed so that $T_W$ is below 3 days in the algae production area feeding the bivalves. The bivalves should exhibit stunting and slowed growth.

If the arrays are being designed to increase nutrient levels, for example, to move from oligotrophic to mesotrophic conditions, $T_W$ should be longer than 3 days in the algae production area feeding the bivalves. No stunting should be noticeable in the mollusks. The array should be located in deeper water where the pseudofeces and feces can build up causing anoxic conditions at the sediment interface. For best results, the array should be placed over soils with elevated phosphorus levels. This will cause the migration of phosphorus from the soil into the water making it available for phytoplankton growth. When the goal is to drive the system Eutrophic, the array should hold the mollusks at the bottom of the photic zone so that all of the material processed by the mollusks falls directly into bacterial laden water below the array for immediate anaerobic processing and recycling of the nutrients.

(d) The mollusk species for use in the array is next chosen. In all but one situation, native, pseudofeces producing mollusk species are chosen which also have after harvest value.

Applicant has found that native species will produce higher success rates, especially ones that historically grew in the waters where the system is to be deployed. Historical production levels are an excellent way to determine (1) what specie was originally in an area, and (2) system carrying capacity. With local species, the we animal's environmental requirements are much easier to meet. Non-native introductions are likely to exhibit a boom/bust population cycle which is hard to control. For success, it is necessary for the system manager to remain in control of biomass which is directly related to filtration capacity. Choosing a native species eliminates many management problems and in many areas regulatory hurdles. Choosing a native species will often improve the survival rate of the selected mollusk to harvest size. Native species usually have an established local market which can significantly reduce overhead cost.

In most cases, it is preferable to choose a bivalve mollusk that is capable of pseudofeces production. Only when the goal is moving from oligotrophic to mesotrophic conditions are non-pseudofeces producing mollusks chosen. This is done to reduce the removal of nutrient bearing particles. Choosing pseudofeces producing bivalves will increase filtration substantially. Pseudofeces producing bivalve mollusks not only remove the particles they ingest for food but they also remove other nutrient rich particles from the water column and deposit them on the bottom for processing by bacteria. These mollusks remove particulate matter which interferes with light transmission into the hypolimnion, enhancing photosynthesis. This is why removal of these particles helps to increase oxygen levels throughout the water column and most importantly at the micro-zone.

Preferably, a species with post harvest value is chosen, for example, shell, meat, pearls, etc. This is important, otherwise a disposal issue must be confronted. In nutrient reduction systems, the harvesting of animals is done in order to keep the filter feeder biomass from outstripping its food supply. Harvesting also permanently removes nutrients from the water column. This is why it is important that the animals not be allowed to die in situ. Death of mollusks in the array can release as much as 90% of the metabolized nutrients they have captured back into the water column.

This is why the practice of removing animals after death is useful in nutrient enhancement systems.

Likely bivalve mollusk candidates are oysters, clams, and mussels. In order to get a feel for the good choices, specific candidates for consideration are given in the following list for the Eastern United States. Salinity is one major consideration.

Salt water species:
   i) Blue mussel *Mytilus edulis*
   ii) Hard clam *Mercenaria mercenaria*
   iii) Scallops Pectinidae sp.

Estuarine Species:
   i) Oyster *Crassostrea virginica*
   ii) Softshell clam *Mya arenaria*

Fresh water Species:
   i) Fresh water mussels Anodonta sp. (Pearls and shells)
   ii) *Corbicula fluminea* (naturalized non-native)

The following lists are helpful in choosing an appropriate mollusk for the Chesapeake Bay which currently needs nutrient reduction:

| Native and pseudofeces producing: | |
| --- | --- |
| Crassostrea virginica | Eastern oyster |
| Geukensia Demissa | Atlantic ribbed mussel |
| Ischadium recurvum | Hooked mussel |
| Petricola pholadiformis | False angel wing |
| Cytropleura costata | Angel wing |
| Mya arenaria | Soft shell clam |
| Tagelus plebius | Stout razor clam |
| Harvest value in descending order: | |
| Crassostrea virginica | Eastern oyster |
| Mya arenaria | Soft shell clam |
| Tagelus plebius | Stout razor clam |
| Cytropleura costata | Angel wing |

Preferably, a species is chosen such that the site where the invention is practiced is in the middle of the environmental range of the species. This will maximize tolerance to various environmental factors (salinity, temperature) which can be a limiting factor needing close attention when choosing a mollusk species. A site that is located near the boundary of one of these limits will regularly experience periods of time when the limit is exceeded. One example of a poor choice for the Chesapeake Bay would be *Mya arenaria*. Although it is found in large numbers in the Chesapeake Bay, it is at the Southernmost extent of its range and is subject to massive die-offs during warm weather where summer temperatures regularly exceed its survival limits. At more northerly latitudes, it would be a good candidate. Such a drastic loss of the animals could result in failure of the system causing micro-zone anoxia which would reverse the nutrient flow; from removal to accumulation.

Filtering rates are another important consideration. One 3" oyster of species *C. virginica* can filter 50–55 gallons of water per day while an adult *Mercenaria mercenaria* can filter 72 gallons per day.

e) Next the intercept array is appropriately sized. Eutrophic, mesotrophic and oligotrophic intercept arrays are different in size and shape. The present invention can be used to change nutrient levels and then maintain these conditions. This is a transitional process and the intercept array must be modified to fit the changing conditions. To be most effective, the mollusks in the array are held in the photic zone. Light does not penetrate as deep in eutrophic water as it does in mesotrophic water. In addition, the phytoplankton biomass is higher in eutrophic waters. Because of these factors, eutrophic intercept arrays will be shallower and contain more shellfish over a broader footprint than a mesotrophic array in the same body of water. Location of the array may also require modification. Changing water nutrient levels will require that the array be continually monitored and modified to meet the change as it occurs. In nutrient reduction systems, as the water clears, phytoplankton populations will be found deeper and the intercept array will need to be adjusted downward. In nutrient enhancement systems, phytoplankton numbers will increase and be found closer to the surface and the array will need to be raised toward the surface. As nutrient levels are controlled, phytoplankton biomass will change. This will require a corresponding change in the array's mollusk biomass.

First, one must decide the level of biological nutrient control desired, and the direction and magnitude of the shift in levels that is desired.

Numerous reasons exist for desiring biological nutrient control. These goals will require different levels of control. In the following examples, goals are listed from low to high removal rates and control levels.

| | |
| --- | --- |
| Low | Large harvestable mollusk numbers from the array. Large harvestable fish numbers. |
| Medium | Re-establishment of rooted submerged vegetation. Target phosphorus and nitrogen levels. |
| High | Water clarity for snorkeling and scuba diving. Drinking water pre-treatment. |

Removing the dense volume of phytoplankton from the surface will be the first step in eliminating eutrophic conditions. Because the photic zone is compressed and submerged aquatic vegetation (SAV) is not initially a problem in eutrophic water, near shore shallow areas can be used.

The area(s) for the temporary plume(s) are chosen where SAV beds are needed to buffer the shoreline from wave erosion whenever possible. This will initially slow the emergence of SAV. Later, it will serve as fertilizer for the new plants for stronger, healthier growth. The establishment of these SAV beds is important because they will reduce sediment loading which will bring with it extra nutrients. Excess sediment in the water also reduces the effectiveness of the nutrient reducing intercept array, so building SAV shore buffers will make the permanent array more efficient. Mollusks receiving excess sediment loads sometimes quit filtering until the event passes. Although the SAV that becomes established will pump phosphorus back into the water column, careful planning of the location of the first beds can directly offset this loading by reducing the erosion load. In a mesotrophic water body, SAV can be expected to re-establish itself in shallow areas where sunlight again can reach the bottom.

In the case of nutrient enhancement systems, increasing the volume of phytoplankton in the surface waters will be the first step in increasing nutrient levels. The photic zone will become compressed and SAV in deeper water will begin to die, releasing nutrients.

The areas for the temporary plume are chosen to fall onto these deep water SAV beds thus establishing and maintaining populations of bacteria to strip oxygen out of the water, most importantly at the sediment interface. This will start the migration of phosphorus trapped in the sediment into the water column. SAV beds can and should be retained if the nutrient enhancement goal is to create mesotrophic conditions. Complete loss of SAV beds will occur in systems where eutrophic conditions are the goal. The array will need to be modified to fit these changing conditions.

SAV beds can alter water flow patterns and engineering plans should take expected changes in size and location into account. Phytoplankton production is poor near or in the limnetic zone (the near-shore zone where rooted SAV occurs), so it will affect the phytoplankton production area. SAV located in shallow water can dramatically slow currents where they become established. Because water will seek the easiest route, it will divert around these beds. This will alter engineering plans in a number of ways. When flows are constricted, water speeds can be predicted to increase. SAV beds will also produce a shadow effect where calmer, slower moving water can be found. Proper engineering of SAV bed locations can greatly enhance the effectiveness of the present invention.

In planning an array, the following data is required:
i) Reason for the need for biological nutrient control and results desired;
ii) Residency time of the algae production area;

iii) Flow rates through the system:
   1) Initial;
   2) Projected;
iv) Filtration capability of chosen mollusk species;
v) Depths of water throughout the system;
vi) Depth of photic zone initially and planned;
vii) Stratification that can be expected;
viii) Upwelling areas;
ix) Projected littoral zones (areas where the planned depth of the photic zone exceeds the water depth).
Parameters to be taken into account:
i) Flow rate, food load, and filtering capacity of mollusk biomass;
ii) Upstream Residency time for algae; 3 days is required to maintain population equilibrium;
iii) Phytoplankton biomass will equal 3 days filtration rate of mollusks when system is balanced for mesotrophic conditions;
iv) Downstream mixing of cleared water for nutrient reduction is where the oxygenated micro-zone is expected to end and the plume must be well within this area.

If 50% of the particulates in the photic zone are removed, the photic zone depth will approximately double since light attenuation by water in shallow depths is usually insignificant. Bog water containing high amounts of humic acid is one exception to this general rule. If the photic zone depth exceeds the depth of stratification, eutrophic conditions will have been eliminated. To eliminate eutrophic conditions, the effective oxygenation depth must exceed actual depth with a reasonable safety factor. Rates of deposition for phosphorus and nitrogen to the bottom depend on filtration capacity of the bivalves, intercept cross section, volume of water flow, nutrient absorption by the phytoplankton, and volume of suspended sediments. Actual TP and TN removals will need to be determined from samples taken and tested and will vary from site to site.

Carrying capacity must be calculated so that it is not exceeded. The carrying capacity is determined by Liebig's rule that there is a limiting environmental factor which inhibits growth of a population beyond a certain point. For algae in freshwater systems, this is usually phosphorus and for saltwater it is usually nitrogen. For mollusks, food supply and oxygen are critical limiting factors. For bacteria, a continuous supply of carbon rich degradable material is necessary.

f) The shellfish production equipment selected for the intercept array must fit the biological and environmental requirements of the species selected.

The present invention does not contemplate placement of mollusks on or in the bottom because bottom culture has numerous shortfalls for the inventive system, especially with burrowing species. The most important of these shortfalls is controlling biomass. Biomass control is important to maintain filtration rates within specifications. Over-harvesting of algae can be as detrimental to the system as is under-harvesting. Animals that cannot be readily seen are difficult to monitor for survival, size and population census. Another problem associated with bottom planting of these animals is that in order to harvest them, one must disturb the sediment. This damages the micro-zone and releases the nutrients the inventive system was designed to control. Unless these problems can be overcome, direct planting on or in the bottom is not advised for the present invention.

Shellfish production equipment selection is both species and site specific and is best left up to the operator. Culture methods for various bivalves vary according to their environmental and physiological requirements. For example, soft shell clams *Mya arenaria* require support from sediment around their shells while species such as *Mytilus edulis* and *Crassostrea virginica* can be suspended in open water. Numerous types and variations of shellfish growing equipment suitable for use in this system are known. Care must be taken to select equipment suitable for the location and the species chosen. Off-bottom systems are best suited to the system so that harvesting and cultivation activities do not re-suspend nutrient bearing materials. It must be, again, strongly emphasized that bottom culture is not recommended for the present invention.

Applicant's Assignee, Circle C Oyster Ranchers Association Inc., employs Applicant's floating oyster reef as an excellent choice for the production of oysters in protected shallow estuarine waters. Sock culture of *Mytilus edulis* using long lines in coastal waters is an excellent method for this species. Floating sand boxes are an excellent choice for clams. When choosing a system, it is best to find one that has been successful in the area for the species to be cultured. Switching either the species or locations for these culture systems would result in failure.

Because sites are quite variable, small scale testing is important to determine viability. The present system is a complex biological system that requires strict adherence to maintaining the biological requirements of phytoplankton, mollusks and bacteria. These three populations must be kept in balance for a biological nutrient control system to work, in accordance with the teachings of the present invention. Control of the system is exercised and maintained through regulation of the mollusk biomass in the intercept array. Grazing and filtration by the mollusks will control the phytoplankton population. Bacterial populations in the plume will also depend on the shellfish. The feces and pseudofeces generated by the shellfish will provide the food source for the bacteria. This population will adjust according to oxygen levels and food supply.

g) Array management and reconfiguration required when conditions change.

Phytoplankton (primary production) removal is monitored using a secchi disk or a light meter. The water entering the array is checked and rechecked downstream to judge the effectiveness of the filtration. If water clarity is too low downstream, more shellfish must be added to the array. If clarity is too high, some of the shellfish are harvested. Adjustments should be made using seasonal averages. In tropical situations where there is no specific growing season, a period of time equal to that of the production cycle is used. If it takes 9 months to take a group of animals from the specific size when they are introduced into the array until harvest begins, then a 9 month average is used to calculate necessary changes in bivalve biomass. As conditions come under control, biomass will need to be adjusted. If over-grazing occurs, phytoplankton removal of nutrients will decrease. This will allow escape of nutrients downstream. Resizing the inventive system is a simple mathematical problem. If the system is removing 10% less phytoplankton than it should, in order to meet nutrient level goals, the filtration capacity of the intercept array is increased by 10%.

Resizing of the array, once desired conditions have been reached, is somewhat more complex. The photic zone will have changed. Phytoplankton numbers will have changed and will be spread throughout the resized photic zone. Therefore, the array will need to be modified and the shellfish density will need to change in order for each animal to receive sufficient food. Many species of phytoplankton move vertically on a diurnal schedule. Zooplankton move down during the day to avoid predation by visually hunting predators such as fish. They move up to graze on phytoplankton at night. In response to this movement of zooplankton, phytoplankton rise toward the surface to take advantage of the sunlight and move down at night in order to avoid predation by zooplankton. When maximizing removal of phytoplankton, the array will blanket the full extent of this diurnal transit. The visual surface footprint will change to fit the new circumstances. If the system was designed with an initial temporary Eutrophic array in shallow water for the establishment of SAV in littoral areas, these sections can be removed once mesotrophic goals have been reached. Systems used to eliminate oligotrophic conditions should also be removed once mesotrophic conditions are reached. Care should be taken in downsizing so that conditions do not re-establish. Removal should be done in stages over several years while the permanent array is being reconfigured to the new parameters of diurnal migration and deepening of the photic zone. This will allow for colonization and establishment of permanent bacteria populations in the new plume footprint that will result from array configuration changes.

In large bodies of water, multiple arrays may be necessary to control over nutrient levels. The upstream array is designed and deployed first. This will eliminate guesswork and errors inherent in predicting what will happen downstream because there are numerous variables and unknowns. It is well known that grazing by any species has an effect on population densities and distribution of plant species within a pasture. Pasture management on land where man has had thousands of years to begin to understand it, is still not an exact science. Management of aquatic pastures is much newer and has many more unknown parameters, and it is three-dimensional. By deploying the upstream array first, stabilizing it and then taking measurements downstream, it will be much easier to determine where another array should be placed if one is needed.

FIG. 1 shows a schematic representation of the process that occurs when a body of water has excess nutrients and the present invention is employed to reduce the nutrients to an appropriate level. As seen in FIG. 1, nutrients come from land, from the air, and from the water as well. The nutrients are mainly nitrogen and phosphorous and may be dissolved in the water, may stick to silt particles or may enhance growth of microscopic plants and animals.

Appropriately placed mollusks can remove a significant amount of these nutrients with some of the nutrients being retained by the mollusk and with other nutrients being embedded within feces and pseudofeces ejected by the mollusk and falling to the bottom.

The phosphorus is prevented from escaping back into the water through the existence of oxygen, and as the mollusks conduct their contribution to the inventive process, the body of water becomes more highly oxygenated, thereby enhancing the retention of phosphorus added to the permanent sediments of the bottom.

Additionally, the presence of oxygen assists the bacteria in turning nitrogen fertilizer into gas which may flow upwardly and enter the atmosphere.

In determining how to practice the inventive process using floating oyster reefs, as explained above, a suitable body of water must be chosen and an appropriate location within the body of water must be chosen where treatment may be conducted.

FIGS. 2–7 depict the Chesapeake Bay and show different stages of the existence of growth of and recession of microscopic plants and animals in the Chesapeake Bay. FIGS. 2–7 show levels of chlorophyll which is indicative of the presence of such microscopic creatures. FIGS. 2–7 were found in the web site of the National Oceanographic and Atmospheric Administration (NOAA) at http://noaa.chesapeakebay.net/odas_sas.html. FIGS. 2–7 comprise overhead views taken in the year 1993 on March 15, April 12, April 29, May 17, May 24 and June 2, respectively.

Figure 9:
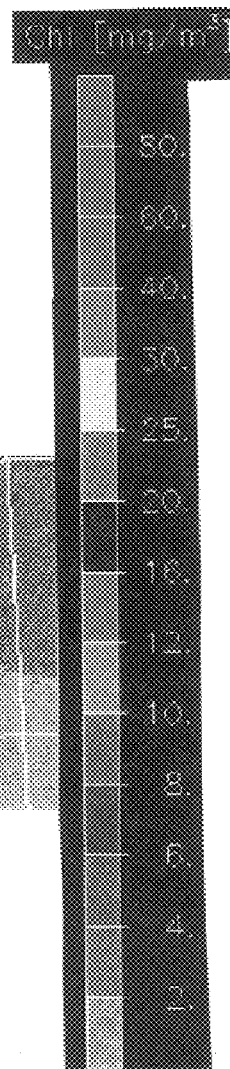
FIG. 9 shows a graph of chlorophyll concentration having shading corresponding to the shading shown in FIGS. 2–8.

FIG. 9 shows the legend from the lowest degree of chlorophyll at the bottom to the highest degree of chlorophyll at the top.

Figure 2:
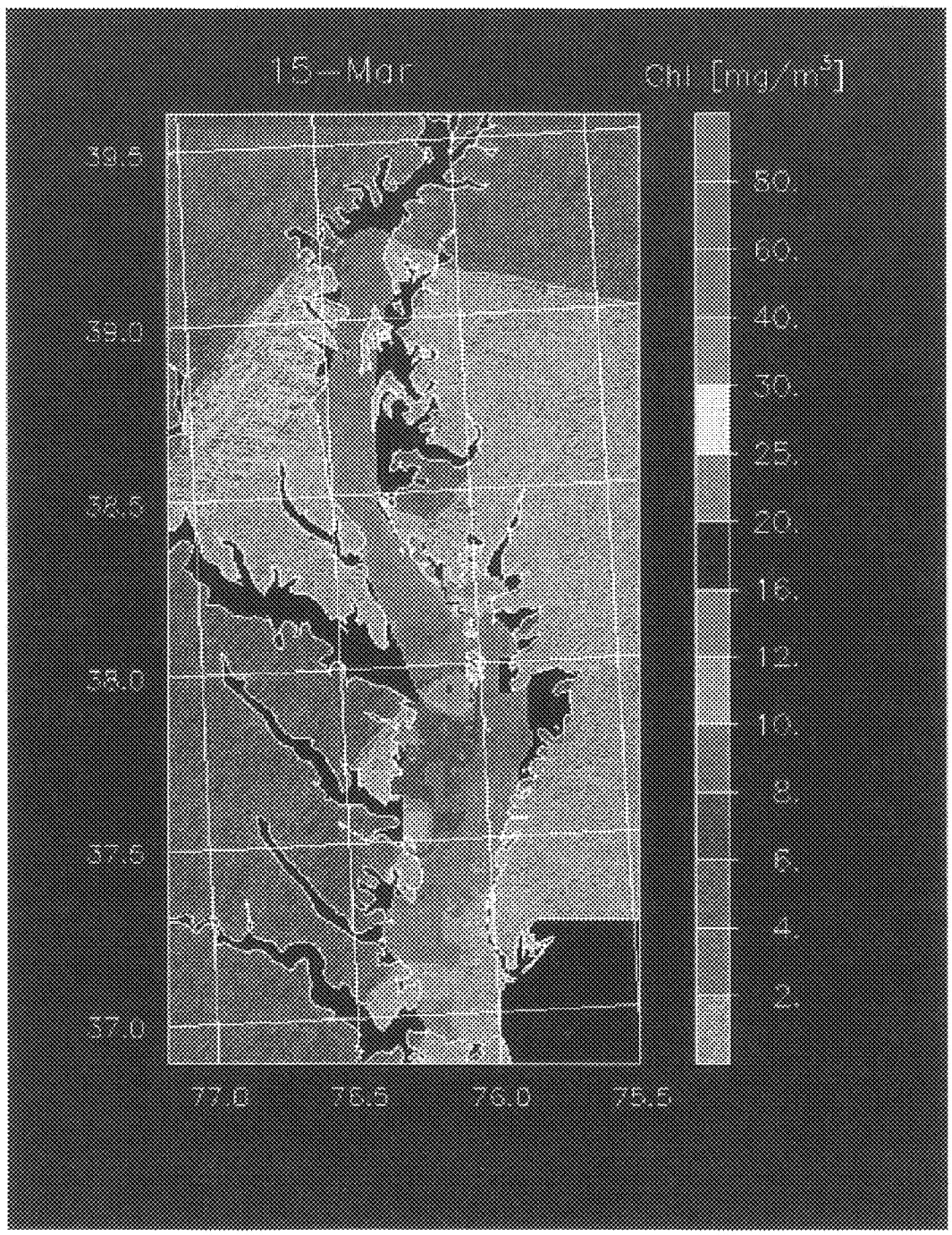
FIGS. 2–8 show a series of maps used, in an example of the teachings of the present invention, to choose a body of water to be treated in accordance with the teachings of the present invention.
Figure 3:
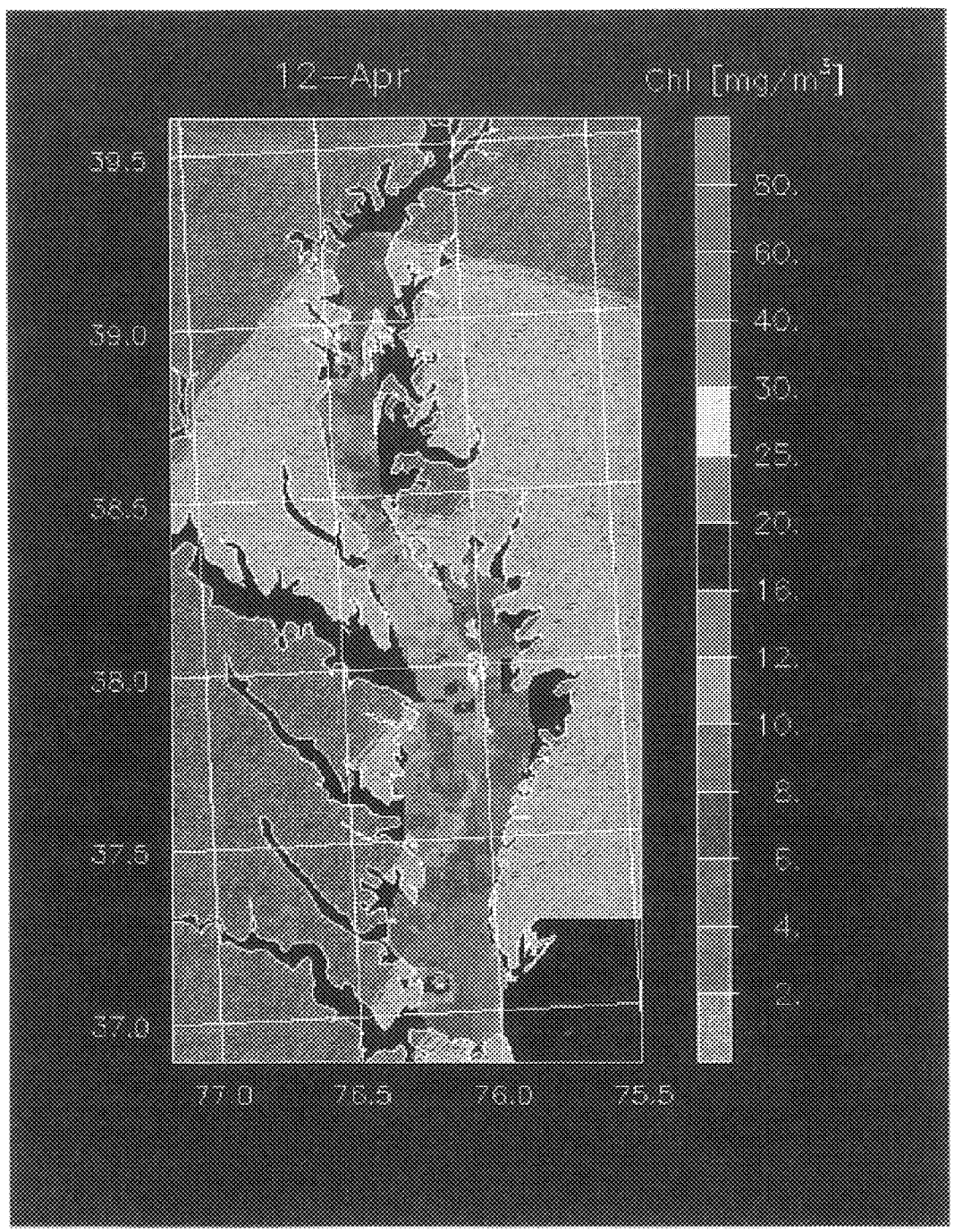
Figure 4:
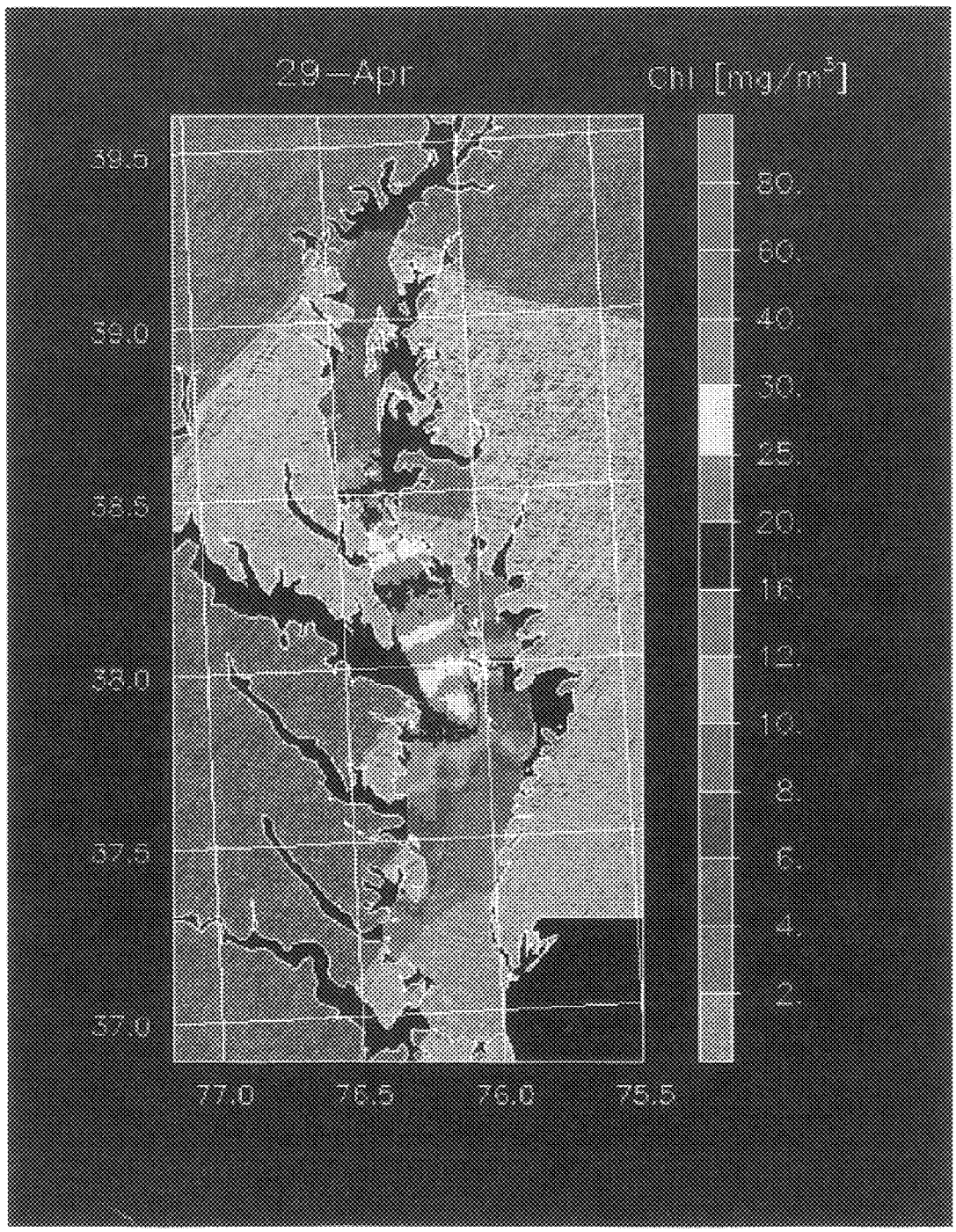

As shown in FIG. 2, the chlorophyll concentration in the entire Chesapeake Bay is quite low, although an algae bloom appears to be developing near the mouth of the Potomac River. As shown in FIG. 3, approximately four weeks later, the bloom has extended as far up the bay as the Patuxent River and is gradually spreading down the Bay. By April 29, (FIG. 4), 2½ weeks later, the bloom has spread further up the Bay and has increased in concentration. By May 17, (FIG. 5), the concentration is even greater and the bloom has spread well above the Chesapeake Bay Bridge. By May 24, the extent of the bloom is somewhat similar to its extent on May 17, however, the concentration of chlorophyll has begun to reduce. By June 2, (FIG. 7), the concentration is similar to that of March 15 (FIG. 2).

In evaluating the water body to see if it is suitable for practice of the present invention, as explained above, one must determine the tidal speed and whether the tide is variable. Preferably, the fertility is eutrophic.

Figure 5:
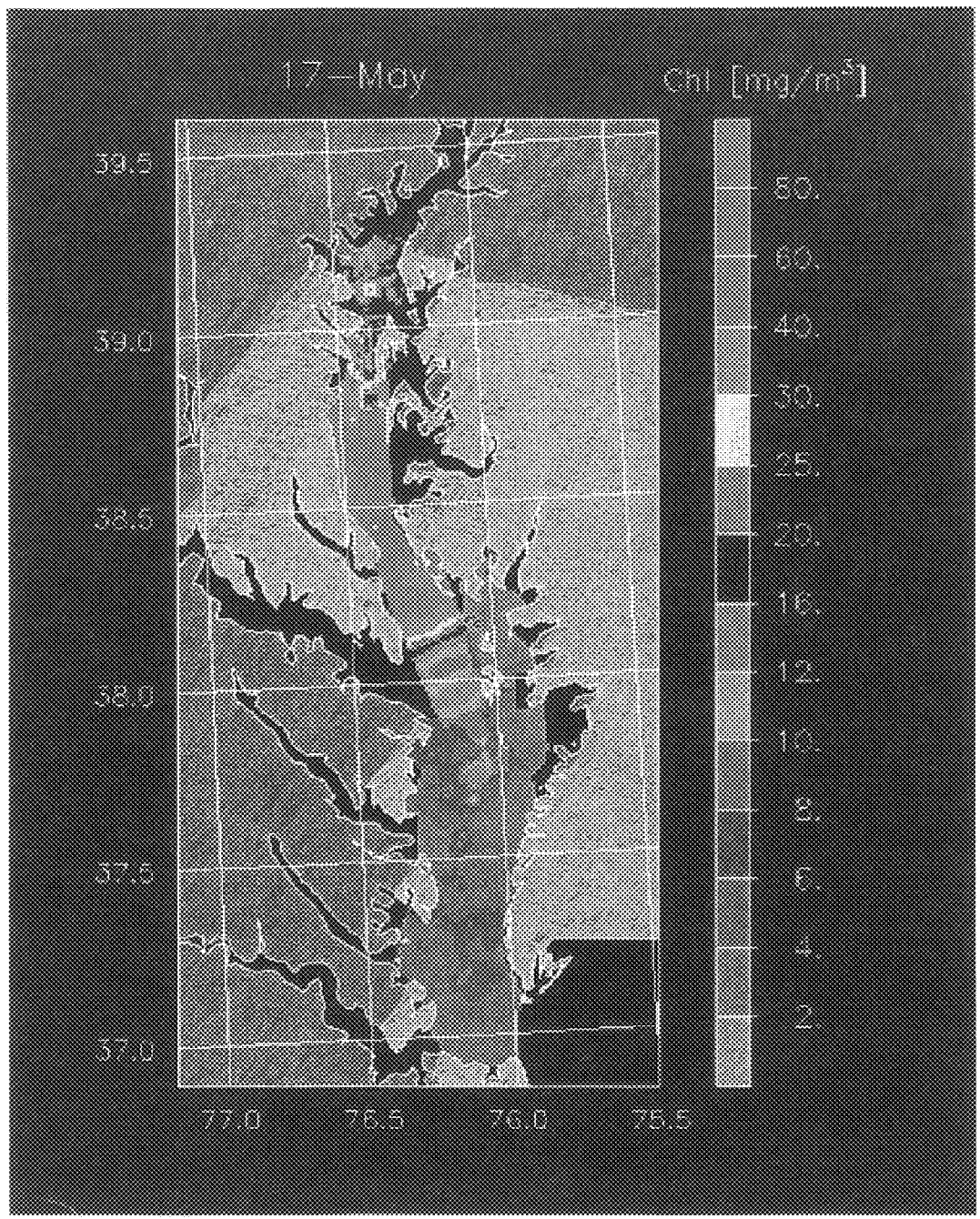
Figure 6:
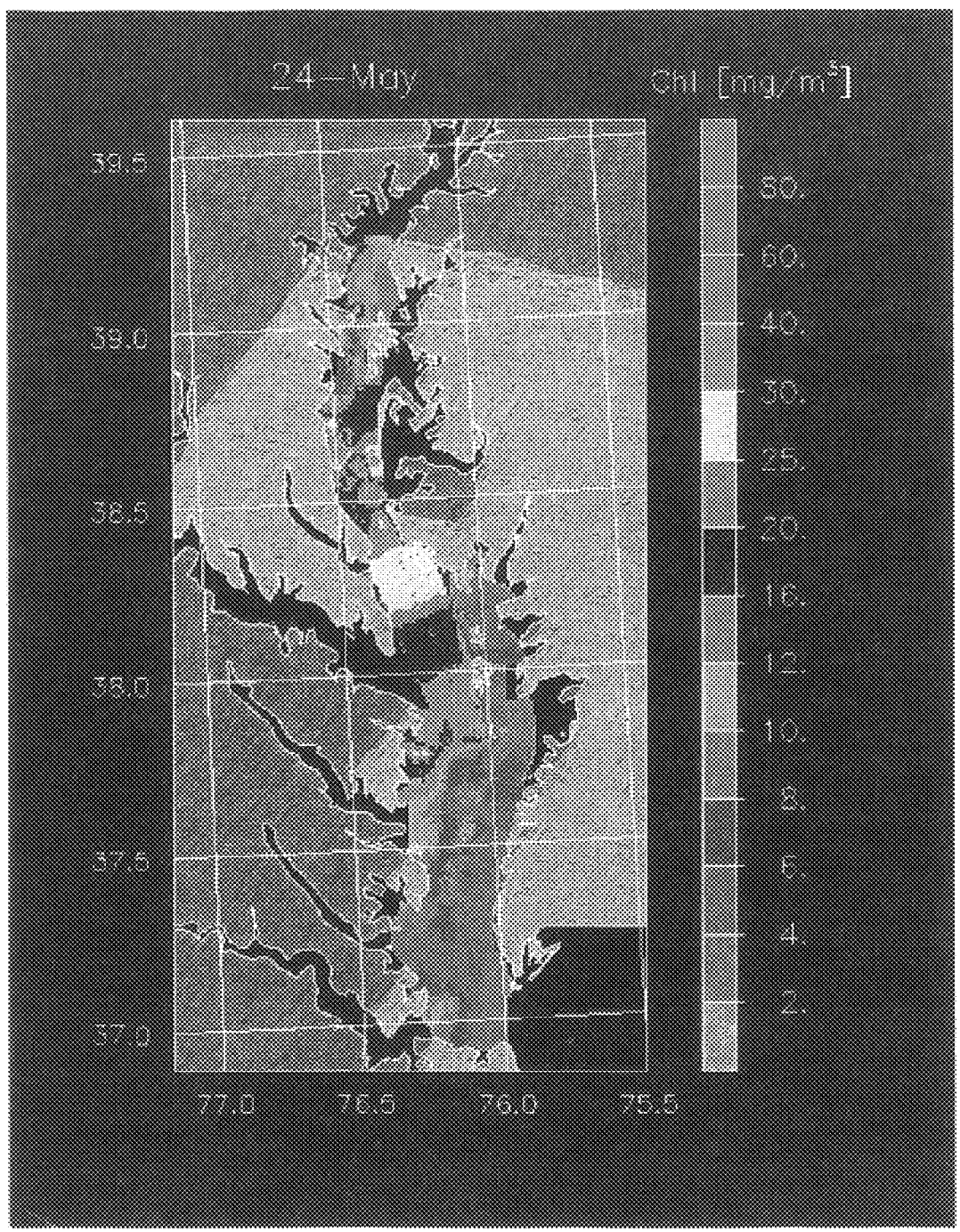
Figure 7:
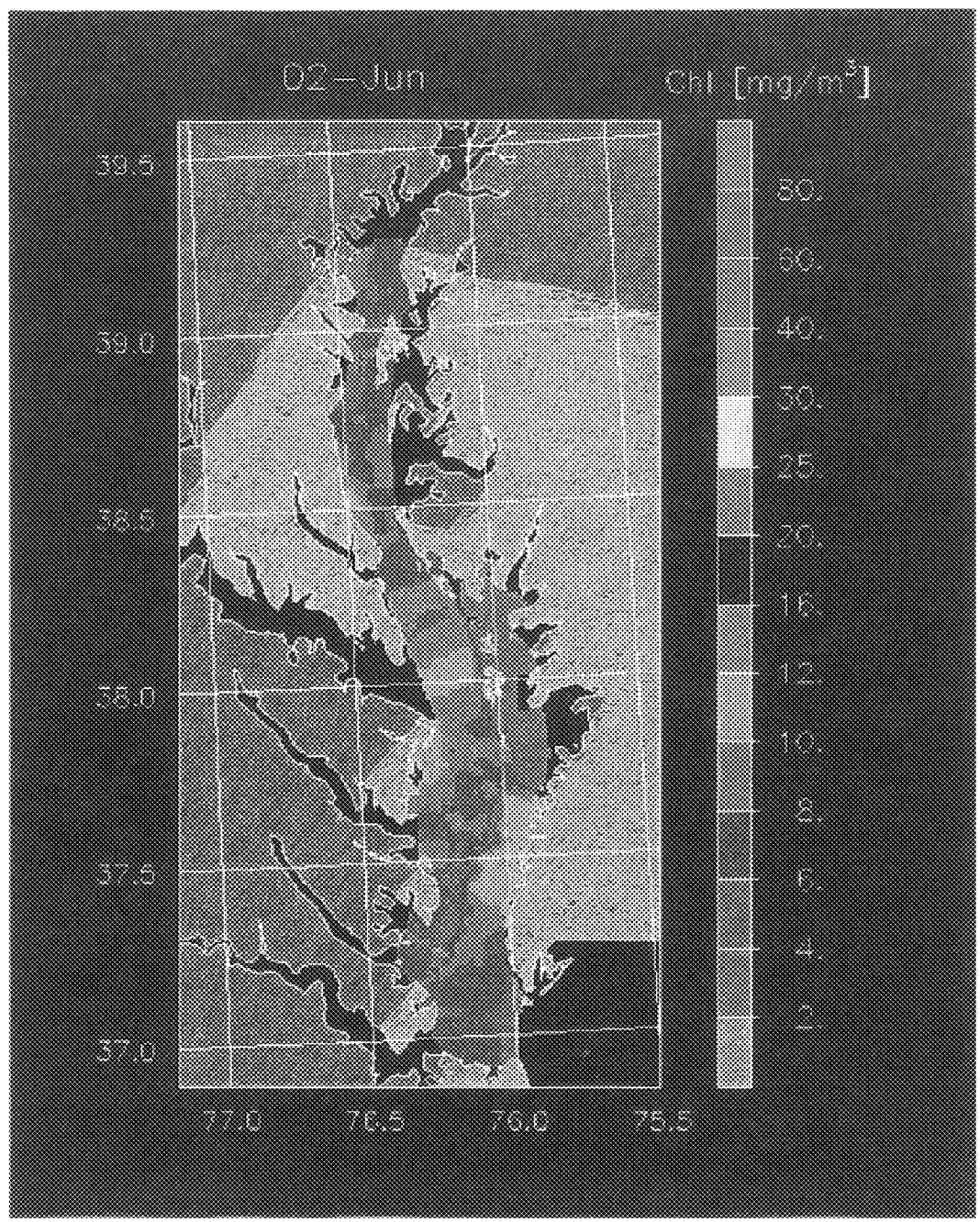
Figure 8:
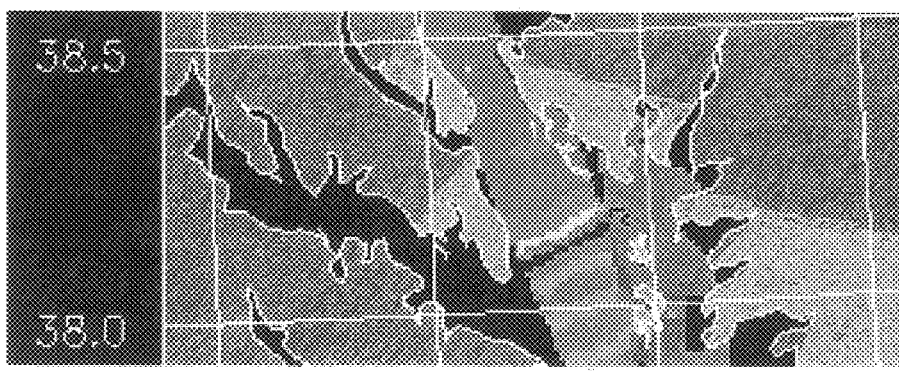

FIG. 8 shows an enlarged portion of the view of FIG. 5 with the arrow depicting an area adjacent the entrance to St. Jerome Creek where the concentration of chlorophyll appears to be in the range of 30 to 40 mg/m$^3$, at the high end of the scale. Applicant has found that this area would be a suitable area to practice the teachings of the present invention.

Figure 10:
FIG. 10 shows a map of an area suitable for treatment using the present invention.

FIG. 10 shows an enlarged view of St. Jerome Creek with identification of various points of interest. In 1998, the Citizens Monitoring Program Alliance for the Chesapeake Bay checked the level of nutrient loading at different dates for St. Jerome Creek and obtained the following data:

| SAMPLE DATE | PO$_4$ (mg P/L) | NO$_2$ + NO$_3$ (mg N/L) | NH$_4$ (mg N/L) |
|---|---|---|---|
| 5/23/98 | 0.004 | 0.16 | 0.024 |
| 6/01/98 | 0.003 | 0.0864 | 0.039 |
| 6/15/98 | 0.009 | 0.1 | 0.027 |
| 7/06/98 | 0.011 | 0.0145 | 0.022 |
| 7/22/98 | 0.01 | 0.0084 | 0.009 |
| 8/17/98 | 0.005 | 0.0215 | 0.025 |
| 8/31/98 | 0.008 | 0.015 | 0.034 |
| 9/14/98 | 0.012 | 0.0187 | 0.03 |

The same organization took samples on the same dates related to the ability of the Chesapeake Bay adjacent St. Jerome Creek to support the life of phytoplankton and obtained the following data:

| SAMPLE DATE | CHLA (ug/L) | SECCHI (m) |
|---|---|---|
| 5/23/98 | 9.01 | 0.8 |
| 6/01/98 | 14.43 | 0.5 |
| 6/15/98 | 15.05 | 0.65 |

-continued

| SAMPLE DATE | CHLA (ug/L) | SECCHI (m) |
|---|---|---|
| 7/06/98 | 17.59 | 0.6 |
| 7/22/98 | 17.27 | 0.5 |
| 8/17/98 | 33.58 | 0.75 |
| 8/31/98 | 25.96 | 0.4 |
| 9/14/98 | 18 | 0.5 |

Applicant found denitrifying bacteria available in multiple species as well as the presence of the following bivalve mollusks:

| | |
|---|---|
| *Crassostrea virginica* | Eastern oyster |
| *Geukensia Demissa* | Atlantic ribbed mussel |
| *Ischadium recurvum* | Hooked mussel |
| *Petricola pholadiformis* | False angel wing |
| *Cytropleura costata* | Angel wing |
| *Mya arenaria* | Soft shell clam |
| *Tagelus plebius* | Stout razor clam |

Concerning pollutants, Applicant found that thermal pollution was non-existent, that chemical contamination was below levels of concern of the Maryland Department of the Environment, and that pollutants from run-off were provided by livestock and wildlife as well as man. Based upon this information, the Maryland Department of the Environment has decided that, due to the pollutants from run-off, it would be best to close the array to harvest following any one-inch of rainfall in a 24 hour period. Based upon the information collected, Applicant has concluded that, with this restriction, St. Jerome Creek is a viable site to practice the present invention.

Figure 11:
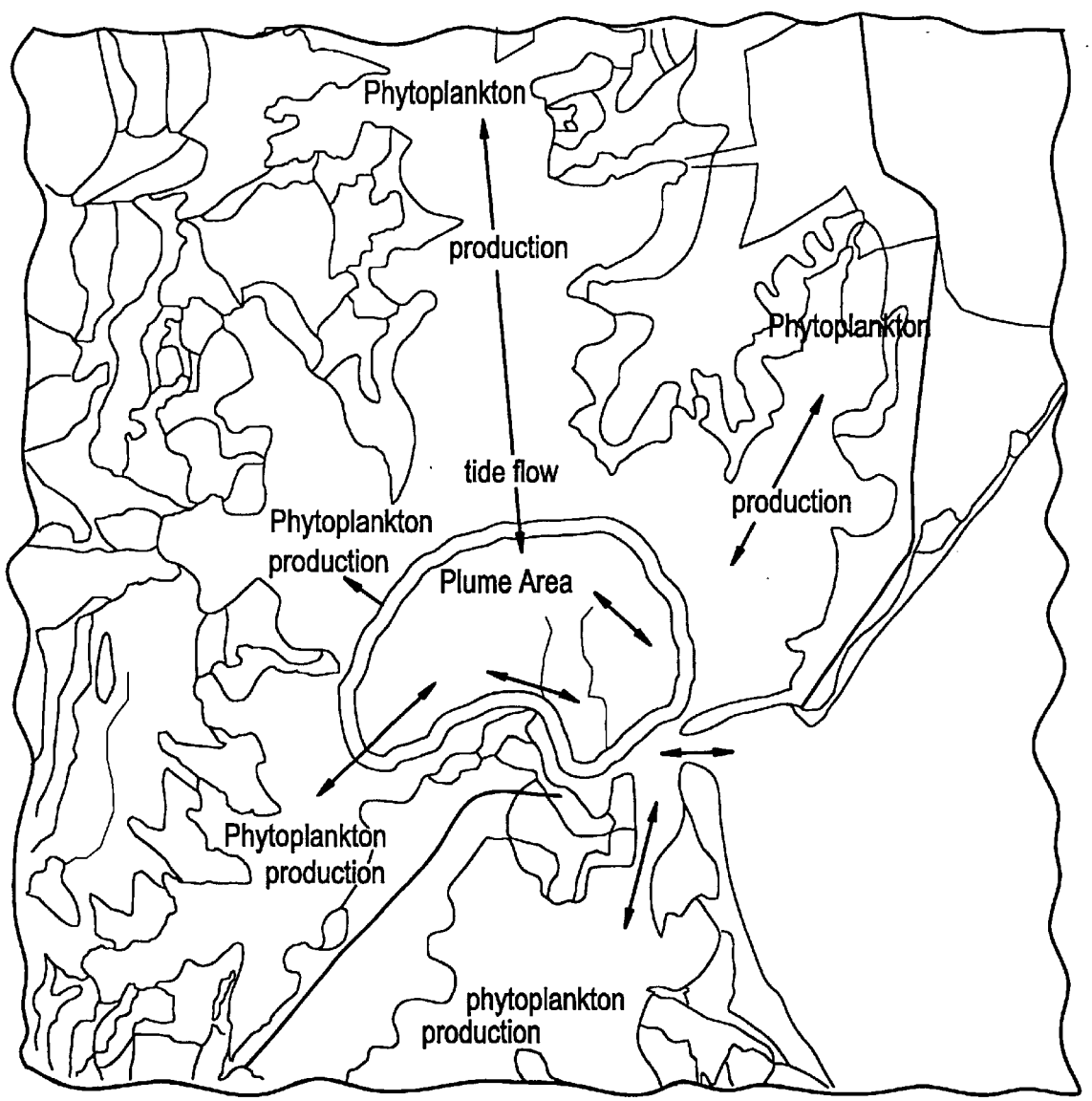
FIG. 11 shows an enlarged portion of the map illustrated in FIG. 10 showing further details concerning water flow and phytoplankton production.

FIG. 11 shows an indication of the plume area which must be determined in accordance with practice of the inventive process as explained above.

Figure 12:
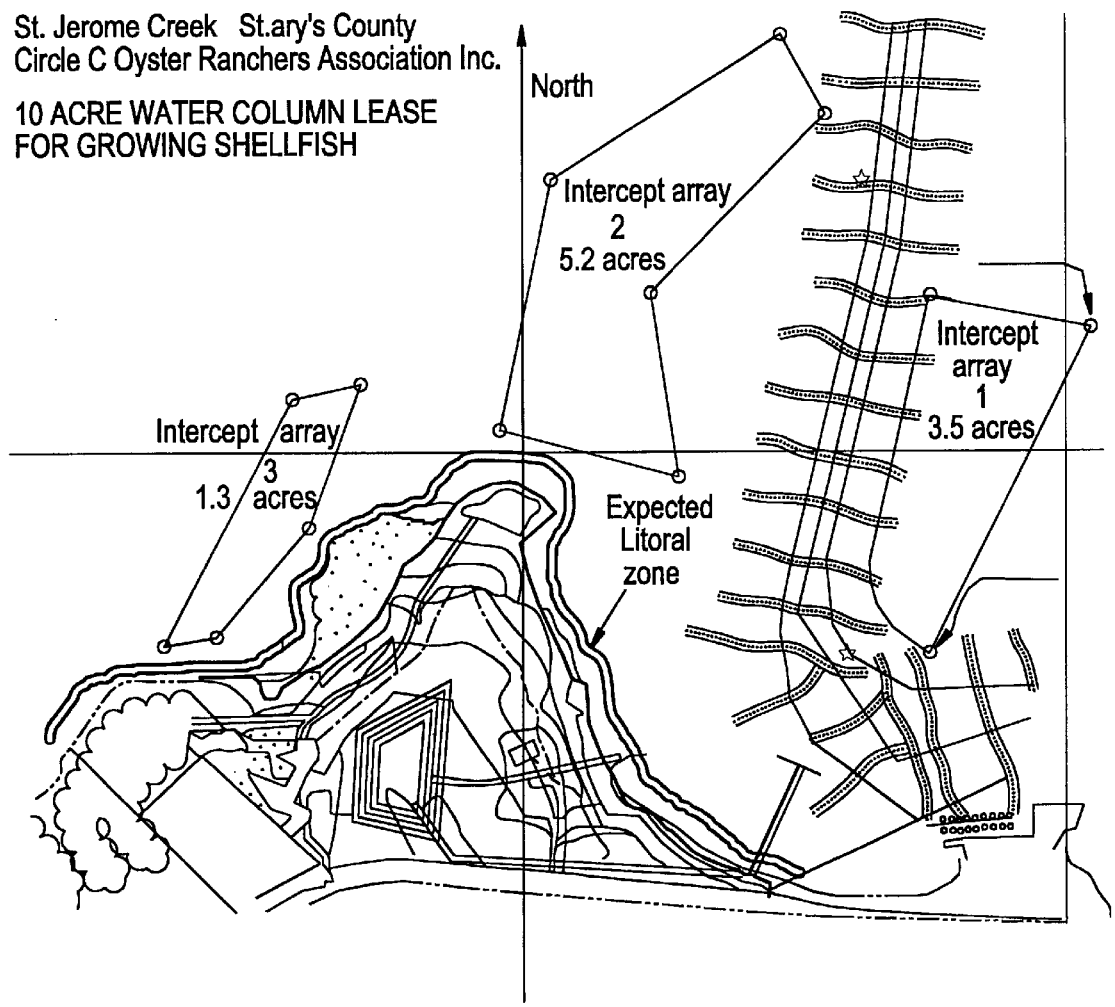
FIG. 12 shows a further map similar to those of FIGS. 10 and 11 with further details concerning the practicing of the teachings of the present invention.

FIG. 12 shows the results of determining where to locate intercept arrays and the results of determination of the extent of each array. As shown in FIG. 12, three arrays are located in appropriate locations with the arrays being 1.3 acres, 5.2 acres, and 3.5 acres, respectively.

With particular reference to FIG. 12, Applicant undertook to study and determine the best estimate of the amount of acreage of St. Jerome Creek that should be covered with intercept arrays.

Figure 13:
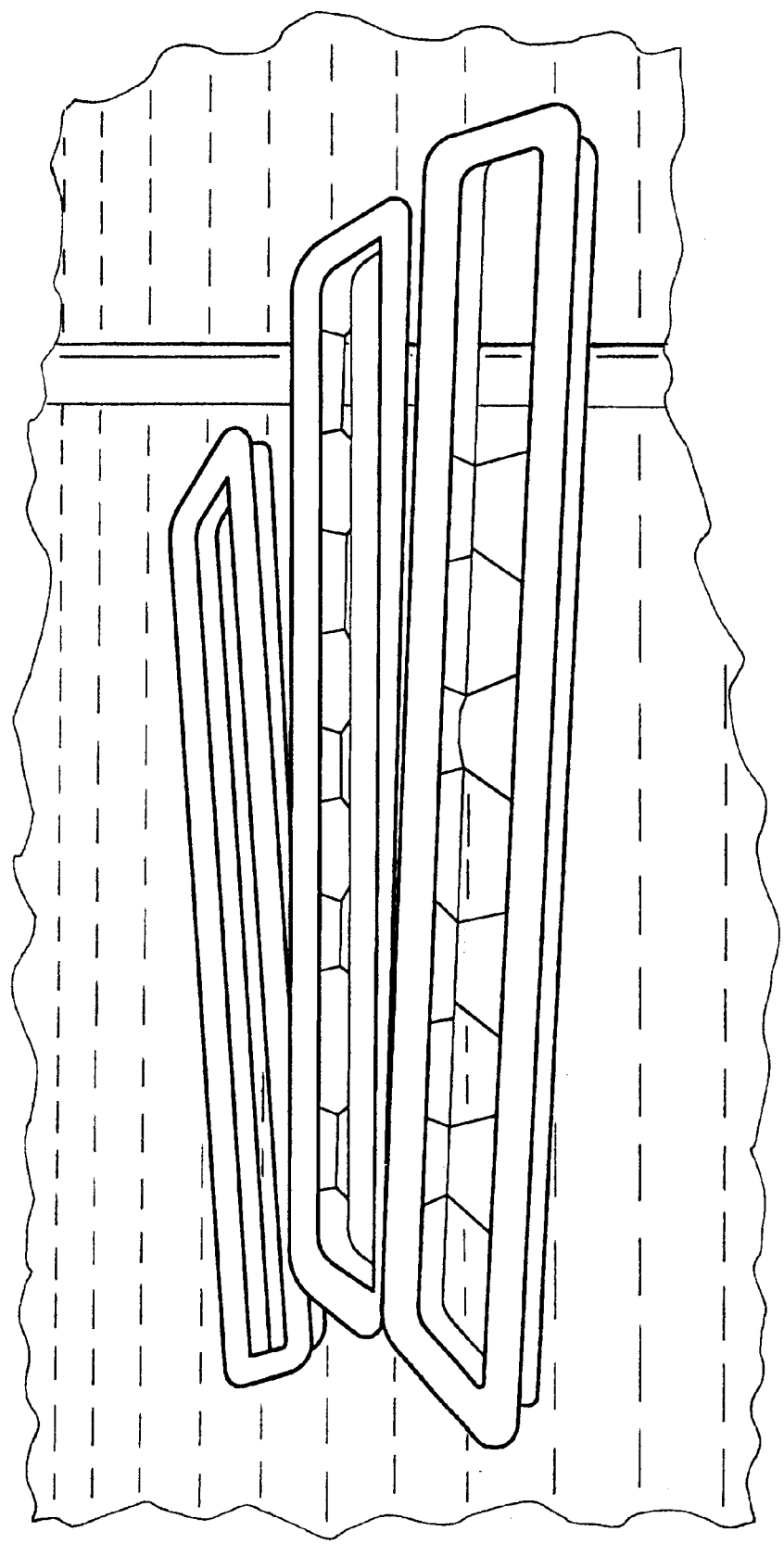
FIG. 13 shows a perspective view of a plurality of floating oyster reefs used in accordance with the teachings of the present invention.

FIG. 13 shows Floating Oyster Reefs including generally rectangular open floats with mesh material extending across each opening to retain mollusks therein as shown. Each of the oyster reefs depicted in FIG. 13 has a capacity of 1,000 three-inch oysters and, based upon the assumption that each oyster can filter 50 gallons of water per day, has a daily filtering capacity of 50,000 gallons of water. As explained above, control of the filtration rate of each array is exercised by either deploying additional mollusks or harvesting superfluous mollusks, as the case may be. As also explained above, an important aspect of the present invention consists of making sure that each oyster reef suspends the oysters off the bottom or sea bed of the body of water where the inventive process is being practiced. Thus, nutrient bearing materials are not in danger of being re-suspended for this example of the use of this inventive process.

The level of fertility that is desired is one in which a permanent littoral zone supporting SAV can be established. This is predicated on:

a) protection of the rhizomes from winter freezing and b) providing sunlight to the water/sediment interface within the targeted littoral zone at high tide to allow sprouting of rhizomes.

During extreme winter low tides, the tide can be expected to drop 30 cm below mean low water. This defines the shoreward boundary of SAV beds. The average tide range is 46 cm. This gives a total of 76 cm from the surface to the bottom where SAV could be expected to grow at high tide. This will set the boundary of the bed at its shallowest point. To begin re-establishing healthy SAV beds, a secchi depth reading of at least 76 cm is desirable. Summer Secchi depth readings currently average 59 cm, a difference of 17 cm. This is the increase in secchi depth readings desired. By reducing TSS (total suspended solids), secchi depth readings will increase.

At these shallow depths, light attenuation which interferes with photosynthesis can usually be attributed almost entirely to Total Suspended Solids (TSS) and dissolved pigments. Placing *C. virginica* in a sample of water from the site showed that it has the ability to remove these materials. We know that one 3" oyster can remove all of the significant light attenuating materials from about 50 gallons of water per day at this location. Using this figure, we can estimate the filtration capacity necessary to reach our goal.

The Northern Prong, Taylor Cove and the Main stem of St. Jerome Creek (due north of the array) will produce phytoplankton that will pass through the intercept array. Phytoplankton produced in the Southern Prong and Malone Bay will escape. Therefore, the phytoplankton production area is approximately two-thirds of the surface area of St. Jerome Creek. St. Jerome Creek has a surface area of 2.4 square miles. The array needs to be sized to remove all of the TSS held in 17 cm of water covering 1.8 square miles of water. 17 cm×0.03281 (CONVERT TO FEET)×640 acres/square mile×1.8 square miles=642.55 acre feet×3.259×$10^5$ (CONVERT TO GALLONS)=209 million gallons. Because phytoplankton needs 3 days to double its population, this is the break even rate for filtration. 209/3=The array needs to process 69.0 million gallons of water a day. Since one 3" oyster can filter 50 gallons of water per day 1,396,049, 3" oysters are required (or the equivalent, biomass should be used for calculations during use of the system). The amount of phosphorus and nitrogen removed by the oysters can be calculated using the processing rate.

As such, an invention has been disclosed in terms of preferred embodiments thereof which fulfill each and every one of the objects of the invention as set forth above and provide a new and useful method for biological nutrient control of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A process for modifying and controlling nutrient levels in a body of water including the steps of:

a) locating an area of moving water within said body of water;

b) choosing a mollusk species known to thrive in said body of water;

c) providing an intercept array designed to receive and retain a plurality of mollusks, said intercept array allowing water flow therethrough;

d) inserting a plurality of mollusks into said intercept array;

e) placing said intercept array within said body of water suspended above a bottom thereof;

f) said intercept array filtering particulates out of said body of water, thereby modifying and controlling nutrient levels in said body of water.

2. The process of claim 1, wherein said locating step includes the step of deciding upon a body of water to be treated, chosen from the group consisting of a lake, pond, stream, river, estuary or ocean bay.

3. The process of claim 2, wherein said deciding step includes the step of determining characteristics of said body of water including temperature range and salinity range.

4. The process of claim 3, wherein said determining step includes the step of determining ability of said area to support life of phytoplankton, nitrifying bacteria, denitrifying bacteria and mollusks.

5. The process of claim 1, wherein said locating step includes the step of determining flow speed of moving water and deciding upon an area where flow speed is in a range of 0.2 to 4.0 knots.

6. The process of claim 1, wherein said providing step includes the step of providing an enclosure including:
 a) a structure causing said enclosure to hold mollusks above a bottom of said body of water;
 b) mesh material connected to said structure to create a mesh enclosure;
 c) said mollusks being retained within said mesh enclosure.

7. The process of claim 6, further including the step of periodically harvesting said mollusks and thereafter providing replacement mollusks in place thereof.

8. The process of claim 1, wherein said inserting step includes the step of inserting bivalve mollusks.

9. The process of claim 1, further including the step of periodically harvesting said mollusks and thereafter providing replacement mollusks in place thereof.

10. The process of claim 1, wherein said inserting step includes the step of inserting oysters.

11. The process of claim 1, wherein said inserting step includes the step of inserting mussels.

12. The process of claim 11, wherein said oysters are known by the name *Crassostrea Virginica*.

13. The process of claim 1, wherein said inserting step includes the step of inserting clams.

14. The process of claim 1, further including the step of filtering particulate organic carbon from said body of water and sedimenting said particulate organic carbon to the bottom of said body of water in the form of feces or pseudofeces.

15. The process of claim 1, further including the step of filtering particulate organic and inorganic nitrogen from said body of water and sedimenting said particulate organic and inorganic nitrogen to the bottom of said body of water in the form of feces or pseudofeces.

16. The process of claim 1, further including the step of filtering particulate organic and inorganic phosphorus from said body of water and sedimenting said particulate organic and inorganic phosphorus to the bottom of said body of water in the form of feces or pseudofeces.

17. The process of claim 16, further including the step of periodically harvesting said mollusks and thereafter providing replacement mollusks in place thereof.

18. The process of claim 16, wherein said inserting step includes the step of inserting oysters.

19. The process of claim 1, further including the step of filtering phytoplankton from said body of water and sedimenting said phytoplankton to the bottom of said body of water in the form of feces or pseudofeces.

20. The process of claim 1, further including the step of filtering zooplankton from said body of water and sedimenting said zooplankton to the bottom of said body of water in the form of feces or pseudofeces.

21. A process for modifying and controlling nutrient levels in a body of water chosen from the group consisting of a lake, pond, stream, river, estuary or ocean bay including the steps of:
 a) locating an area of water within said body of water flowing at a speed in the range of 0.2 to 4.0 knots;
 b) choosing a mollusk species known to thrive in said body of water;
 c) providing an intercept array designed to receive and retain a plurality of mollusks, said intercept array allowing water flow therethrough, said intercept array comprising an enclosure including:
  i) a float structure causing said enclosure to float above a bottom of said body of water;
  ii) mesh material connected to said float structure to create a mesh enclosure;
  iii) said mollusks being retained within said mesh enclosure;
 d) inserting a plurality of mollusks into said enclosure;
 e) placing said intercept array within said body of water suspended above a bottom thereof;
 f) said intercept array filtering particulates out of said body of water, thereby modifying and controlling nutrient levels in said body of water.

22. The process of claim 21, wherein said oysters are known by the name *Crassostrea Virginica*.

* * * * *